United States Patent [19]

Gamblin et al.

[11] 4,155,103
[45] May 15, 1979

[54] DOT MATRIX COPYING APPARATUS

[75] Inventors: Rodger L. Gamblin, Oakwood, Ohio; Robert C. Howard, Arcadia, Calif.

[73] Assignee: The Mead Corporation, Dayton, Ohio

[21] Appl. No.: 855,346

[22] Filed: Nov. 28, 1977

[51] Int. Cl.$^2$ .......................... H04N 1/10; H04N 1/36
[52] U.S. Cl. ............................... 358/296; 250/237 G; 358/264
[58] Field of Search ............... 358/296, 298, 302, 293, 358/78, 264; 179/100.3 G; 250/237 G

[56] References Cited

U.S. PATENT DOCUMENTS

| 4,106,061 | 8/1978 | Burnett | 358/296 |
| 4,112,469 | 9/1978 | Paranjpe | 358/296 |

Primary Examiner—Bernard Konick
Assistant Examiner—Alan Faber
Attorney, Agent, or Firm—Biebel, French & Nauman

[57] ABSTRACT

A dot matrix copying device includes optical rectification apparatus comprising storage means for storing image information in dot matrix form and means for transferring the stored information to a dot matrix print head. The image information is derived by simultaneously scanning an original document and an optical grating positioned adjacent thereto and directing the scanned scene toward an array of photosensing elements, one of which is positioned to view the optical grating. The optical data so derived is stored in the storage means under timing control of the photosensing element which views the optical grating.

7 Claims, 6 Drawing Figures

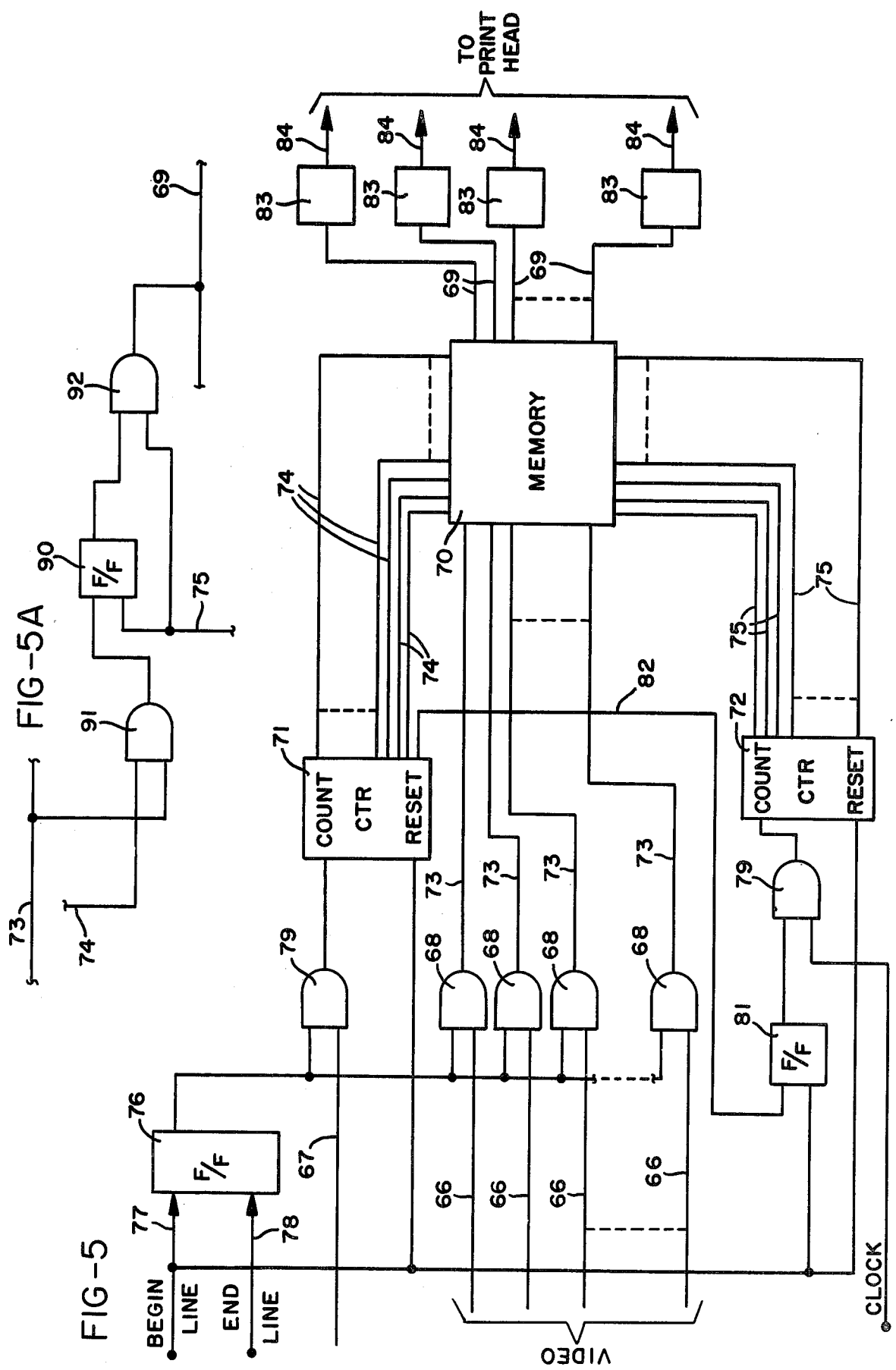

DOT MATRIX COPYING APPARATUS

BACKGROUND OF THE INVENTION

This invention relates to dot matrix copying devices suitable for ordinary office use. A typical copier of the type to which this invention applies is disclosed in Paranjpe et al, Ser. No. 789,417 filed Apr. 21, 1977, now U.S. Pat. No. 4,112,469. In the Paranjpe device there is a first lens which scans a document to be copied and a second lens which focuses a portion of the document upon an array of photodiodes. The first lens collimates the image of the document and directs a beam of collimated light upon a rotating mirror. The second lens receives collimated light reflected from the face of the rotating mirror for focusing upon the photodiodes. Output signals from the photodiodes provide switching control for an array of ink jets directed toward a copy paper mounted on a rotating drum. The drum is caused to rotate in synchronism with the rotation of the above mentioned mirror.

The Paranjpe apparatus has a problem in common with most office copiers. That is, the optics must view a large area in at least one dimension, and this is not readily achieved without use of very expensive lenses. The cost of such lenses may in some cases be excessive for such an application. The usual solution for this particular cost problem is one of compromise. That is, optics sre selected which will give marginal performance, with distortion at the edges of the field of view in an amount which is believed to be generally acceptable to the user. So far as is known, there is no available copy device which will provide accurate non-distorted reproduction over a wide scanning field of view with simple, modestly priced optics.

SUMMARY OF THE INVENTION

This invention reduces distortion in printed copy by use of an optical grating which extends across the document plane. This grating is scanned together with the scanning of the document so that images of the grating lines are swept successively across one photodiode. Meanwhile, picture elements representing the document are swept across other photosensing elements and are read into a digital memory under synchronizing control of output signals from the photosensor which views the grating.

While one portion of the document is being read into memory, another portion of the document, which was previously scanned and stored, is being read out of memory. Output reading is under control of a clock which is synchronized with the operation of an array of printing elements. The printing elements reproduce the document in dot matrix format, and the reproduction is relatively distortion free, because of the sampling control produced by the optical grating.

The recording elements, which preferably are ON/-OFF controlled ink jets are arranged in correspondence with the arrangement of the photosensors. Each photosensor, together with its corresponding recording element and the electronics therebetween, constitutes a single recording channel. Each recording channel includes a digital storage area having a capacity which depends upon the amount of distortion expected from the focusing optics. In general this storage area will include storage locations equal in number to the number of optical grating lines encompassed within the maximum distortion distance. The memory comprises the combined storage of all recording channels.

BRIEF DESCRIPTION OF THE DRAWINGS

FIG. 5 is a schematic diagram of the data processing system employed in the practice of this invention.

FIG. 5A is a schematic diagram of internal memory connections.

DESCRIPTION OF THE PREFERRED EMBODIMENTS

Figure 1:
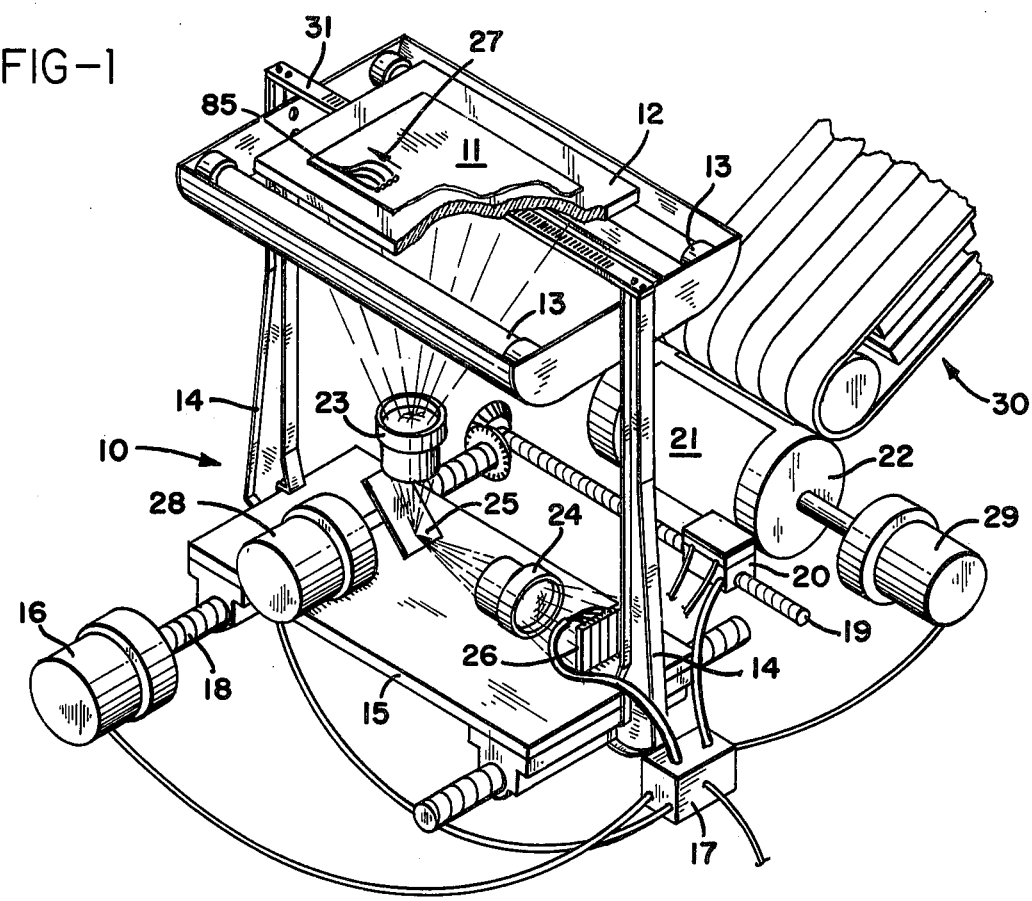
FIG. 1 is a partially cut away perspective view of a recorder constructed in accordance with this invention.

The overall general arrangement of a recorder 10 constructed in accordance with this invention is shown in FIG. 1. As illustrated therein, an original document 11 is placed faced down on a glass support 12. In this position document 11 is illuminated by light from a pair of bulbs 13 supported by a pair of posts 14.

Posts 14 are mounted on a table 15, which also carries the scanning optics. There is a drive motor 16 controlled by a controller 17 to rotate a worm 18. Worm 18 causes one directional scanning movement of table 15 and also rotates a second worm 19. A jet drop recording head 20 is mounted on worm 19 for translational movement in synchronism with the movement of table 15. Print head 20 directs a series of ink jets (not illustrated) toward a recording sheet 21 mounted on a drum 22.

The optical system comprises a scanning lens 23, a focusing lens 24, and a rotating mirror 25. Scanning lens 23 is positioned in such a manner that the face of document 11 is in its focal plane. Accordingly, scanning lens 23 collimates the light rays reflected from the face of document 11 and directs a collimated light beam toward mirror 25. Focusing lens 24 receives light reflected from the surface of mirror 25 and directs it toward an array of photosensors 26. Photosensors 26 are positioned in the focal plane of lens 24, so that the photosensors view a series of picture elements 85 along a scanning line segment which is swept in the direction of the arrow 27.

The rotation of mirror 25 is produced by a drive motor 28, which is also connected to control unit 17. Control units 17 synchronizes the rotation of drive motor 28 with the rotation of another drive motor 29. Drive motor 29 controls the rotation of drum 22, so that recording sheet 21 is swept past recording head 20 in synchronism with the sweeping of the document image across photosensors 26.

Also illustrated in FIG. 1 is a paper transport mechanism 30, which is described in more detail in Paranjpe et al Ser. No. 789,417. The Paranjpe application also provides a detailed description of the operation of print head 20. Generally speaking, print head 20 may be constructed as taught in Beam U.S. Pat. No. 3,586,907, and the spacing between jets may be adjusted for spiral interlacing as taught by Paranjpe et al.

Figure 2:
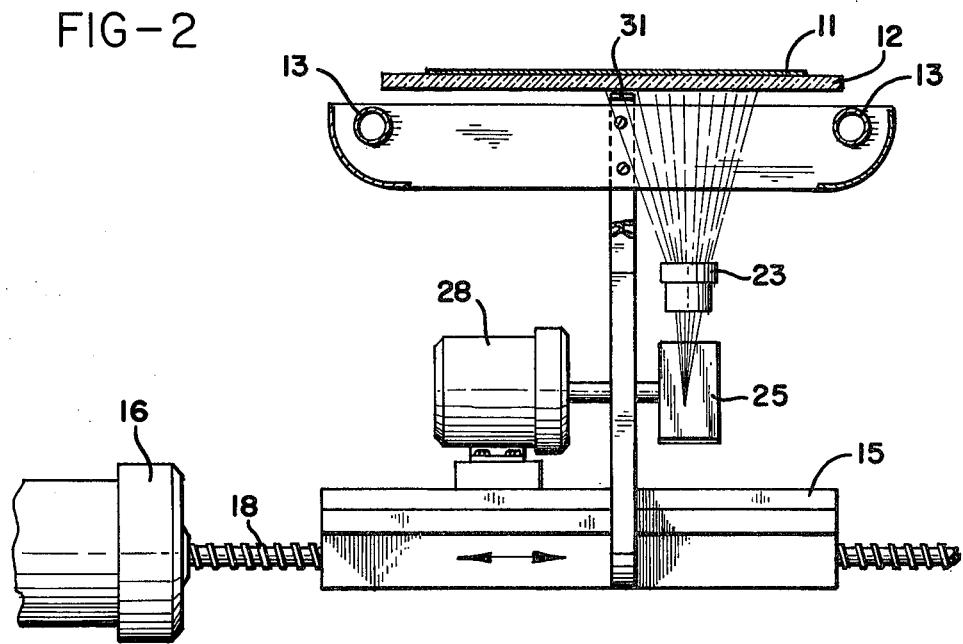
FIG. 2 is a side elevation view of the recording apparatus of FIG. 1.

In order to compensate for distortion introduced by the optical elements there is provided a grating 31 which is positioned for viewing by one of the photosensors 26. Grating 31, which is illustrated in detail in FIG. 3, is supported by the posts 14 for movement across the document plane as illustrated in FIG. 2.

Figure 3:
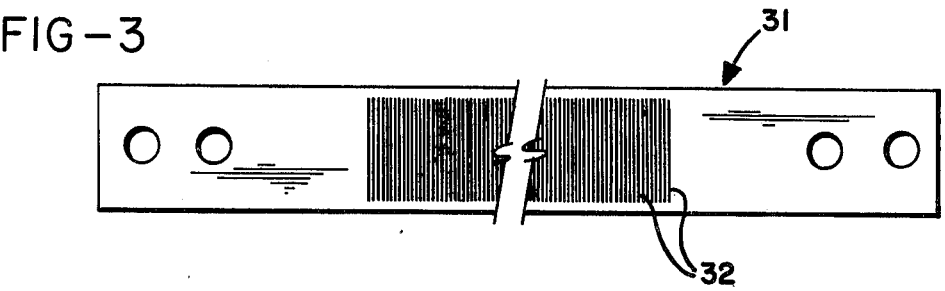
FIG. 3 is an illustration of an optical grating.
Figure 4:
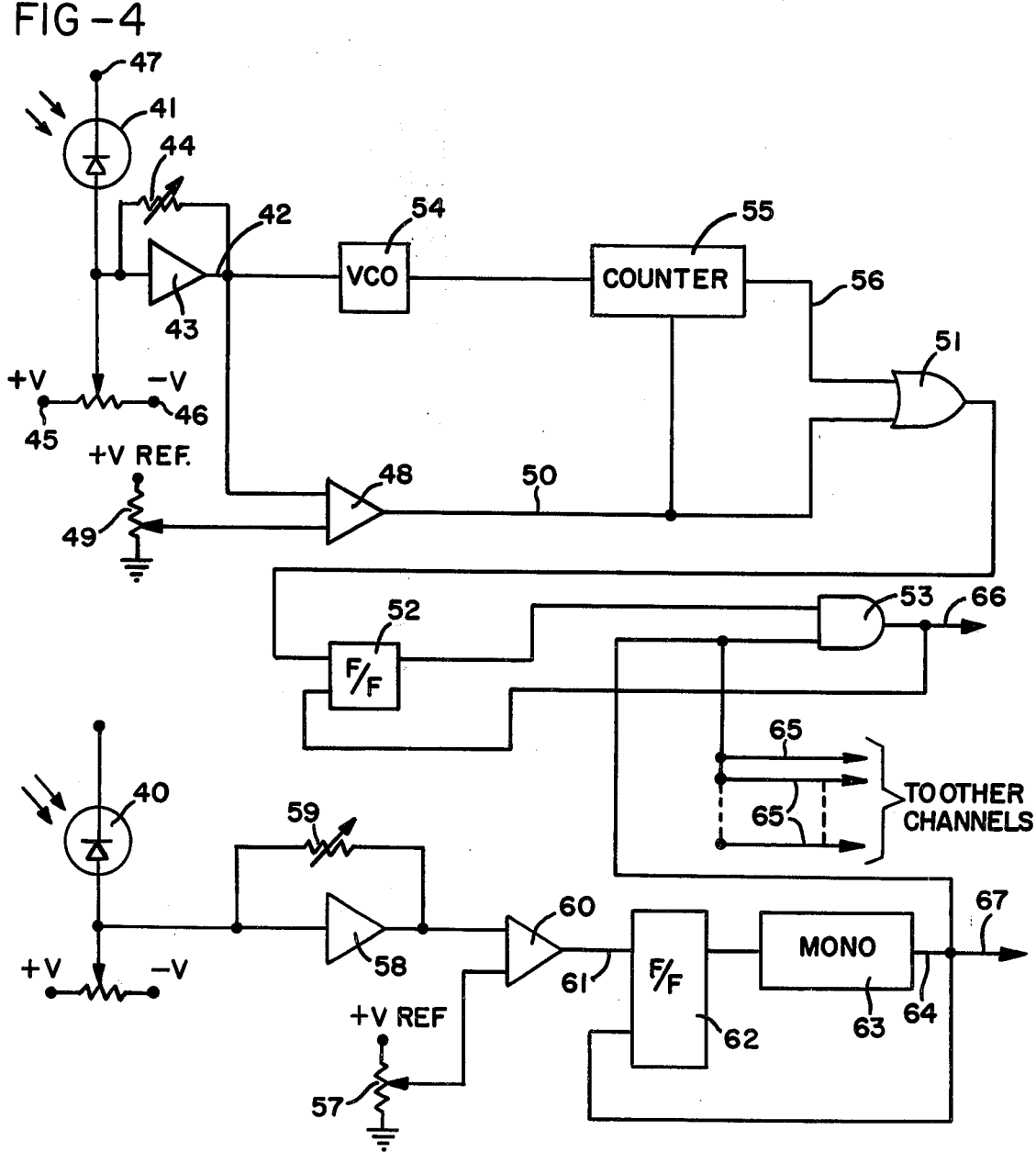
FIG. 4 is a schematic diagram of a data sampling circuit for one recording channel.

Referring now to FIG. 3 it will be seen that grating 31 comprises a series of lines 32, which are focused on one photosensor 40 for control of circuitry illustrated schematically in FIG. 4. The spacing between lines 32 depends upon the recording resolution for which the system is designed. For a reasonably high quality recorder the spacing between lines 32 may be in the order of 0.1 mm to provide a recording resolution of ten lines per mm. The circuitry which is controlled by photosensor 40 creates a pulse each time a new line 32 is swept past photosensor 40. This pulse clocks into memory one video sample from each of the other photosensors, such as photosensor 41 of FIG. 4. The memory must be sized to store sufficient samples from each channel to accommodate the maximum anticipated distortion. Thus if a distortion in the order of about ±1 cm is expected, as many as 200 of the lines 32 might be encompassed within the region of optical distortion. Thus a fifty-nine nozzle array as described in Paranjpe et al would require a memory of 59×200 or 11,800 locations to accommodate such distortion.

Referring now to FIG. 4, the optical sampling operation will be described. Signals for such samples are provided by photodiode 41, which is merely one of an array of similar photodiodes, all of which drive a circuit similar to the one illustrated in FIG. 4. The purpose of photosensor 41 is to create a signal on line 42 which varies in accordance with the level of the light being observed by the photosensor. The signal on line 42 is generated by operational amplifier 43 and variable resistor 44 in accordance with the reverse current passing through photosensor 41. Reference voltages for operation of photosensor 41 are applied as illustrated to terminals 45, 46, and 47.

The video signal on line 42 is applied to a comparitor 48 for comparison with a reference potential from potentiometer 49. Whenever the signal on line 42 exceeds the reference potential from potentiometer 49, then comparitor 48 provides an output signal on line 50, which is gated through OR gate 51 to set a flip-flop 52. When flip-flop 52 is set, then grating pulses generated in response to grating line images are gated through AND gate 53 onto line 66 for use as hereinafter discussed.

The video signals on line 42 are also applied to a voltage controlled oscillator 54 which provides output pulses for counting by a counter 55. Counting by counter 55 proceeds at a rate dependent upon the amplitude of the signal on line 42. Each time counter 55 reaches a predetermined count it provides an output pulse on line 56. Counter 55 has an internal reset, so that VCO 54 and counter 55 function as a digital integrator. As a result, the signal on line 56 represents the light level being observed. As the light level increases the pulses on line 56 increase in frequency, and this in turn affects the spacing of printed dots recorded on paper 21 by print head 20. The human eye interprets this as gray level.

As shown in FIG. 4 the output from comparitor 48 is applied to counter 55, so that counter 55 is reset whenever the signal on line 42 exceeds the reference potential from potentiometer 49. Flip-flop 52 therefore is set either by pulses from counter 55 or by an output signal from comparitor 48. This provides good gray scale reproduction while maintaining accurate image edge definition, all as described and claimed in Burnett Ser. No. 774,154, filed Mar. 3, 1977, now U.S. Pat. No. 4,106,061.

The grating pulses which are gated through AND gate 53 as above described are generated by circuitry also illustrated in FIG. 4. This circuitry includes photosensor 40, potentiometer 57, operational amplifier 58, variable resistor 59, and comparitor 60. The operation of these elements is similar to the operation of photosensor 41, potentiometer 49, operational amplifier 43, variable resistor 44, and comparitor 48 respectively, all of which have been previously discussed. Thus it will be seen that comparitor 60 produces an output signal on line 61 each time a grating line 32 is focused on photosensor 40. This sets flip-flop 62, causing monostable multivibrator 63 to generate a grating pulse on line 64. The grating pulse on line 64 is applied to AND gate 53 for gating onto line 66 as above discussed. The pulse is also applied to a series of lines 65 for application to AND gates corresponding to AND gate 53 in other recording channels (not illustrated). The grating pulse also resets flip-flops 52 and 62 as illustrated. It will be understood that amplification may be required for such extensive use of the grating pulse, but the circuitry as illustrated is simplified by omitting the necessary amplifiers.

The data processing system, as illustrated in FIG. 5, includes the memory 70 as its primary element. Memory 70 stores video data which appears continuously as a series of pulses on each of lines 66. There is one line 66 for each recording channel, pulses being generated thereon as described above in connection with FIG. 4. For a recorder as described in the Paranjpe et al application, there may be fifty-nine such lines 66 whch carry video pulses for gating through a series of AND gates 68 into memory 70. After a period of time all such video pulses are gated out of memory 70 onto fifty-nine output lines 69. Writing of video information into the memory is under the control of an input control counter 71, and output reading onto lines 69 is under the control of an output control counter 72.

Memory 70 is a random access device having a series of parallel storage chains corresponding in number to the number of recording channels. Each storage element in each chain is connected to one of the illustrated lines 73 for reception of video pulses from an associated gate 68. Counter 71 selects the storage location for each bit of data, storage locations being assigned sequentially in accordance with output counts on a series of lines 74 as illustrated. For the system as described, with a maximum expected distortion of ±1 cm and a grating spacing of ten lines per mm, there may be 200 lines 74. Correspondingly, there are 200 lines 75, which carry output counts from counter 72.

Each count on one of lines 75 causes all of lines 69 to read the data stored in the designated one of 200 memory locations. Counters 71 and 72 are so set that output reading proceeds cyclically through storage locations which on the average are about 100 positions behind the input writing. Each time the contents of a storage location are read out onto one of output lines 69, the memory location is erased to await new data from one of lines 73 at a time determined by the output count on counter 71.

Connections for one storage location 90 within memory 70 are illustrated in FIG. 5A. As shown therein, the storge location may be a flip-flop, which is loaded with video data from line 73 as gated through AND gate 91 under control of an address signal on line 74. The same line 74 is connected to one storage location in each of the other channels, while line 73 is connected to all storage locations within the same channel. Similarly, output addressing is accomplished by gating the output of flip-flop 90 through AND gate 92 under control of an address signal on line 75. The output of AND gate 92 is applied to line 69, which is connected also to AND gates serving all other storage locations for the same recording channel. Line 75 is connected to AND gates such as AND gate 92 for corresponding storage locations in each of the other recording channels. Line 75 is also connected to the reset terminal of flip-flop 90 to erase the storage location after output reading.

The data processing system also includes a flip-flop 76, which is set by an input on line 77 and reset by another input on line 78. Lines 77 and 78 are connected to switches, not shown, which generate beginning of line and end of line signals respectively.

At the beginning of each scanning line flip-flop 76 is set by a signal on line 77, and this enables AND gates 68 to provide video pulses to memory 70. It also enables AND gate 79, so that counter 71 can begin counting grating pulses appearing on line 67. The reset terminal of counter 71 is connected to line 77 as illustrated, so that the count will be reset at the beginning of each scanning line.

The counting terminal of counter 72 is connected to the output of AND gate 79 for counting clock pulses appearing on line 80. These clock pulses are generated by controller 17 in synchronism with the rotation of drive motors 28 and 29. AND gate 79 is enabled by an output from the set terminal of flip-flop 81.

Flip-flop 81 is set by an output from counter 71 on line 82. For the system as described, with 200 counting lines 74, line 82 is connected internally of counter 71 to that one of lines 74 which carries the 100th count. This sets flip-flop 81 to enable AND gate 79 and cause counter 72 to begin counting with a count which is 100 counts behind the count of counter 71.

During the course of one scan line the counting difference between counters 71 and 72 varies in accordance with the distortion being created by the optics. However, with a memory sized as aforesaid and with an initial count difference of 100, counter 71 can neither fall behind nor overtake counter 72.

As also illustrated in FIG. 5, the reset terminals of flip-flop 81 and counter 72 are connectd to line 77. Thus at the beginning of each scanning line counter 72 is reset and the input count is interrupted pending receipt of an enabling signal from counter 71. After the end of a scanning line and before the beginning of the next line, counter 72 continues reading out the contents of memory 70 onto lines 69. This produces no printing, however, because each output reading erases the memory location being read. Inasmuch as AND gates 68 are all disabled at the end of each printing line, nothing is being written into the erased locations.

The output signals from memory 70, which appear on line 69, are applied to a series of monostable multivibrators 83, which generate printing control pulses on lines 84. Each line 84 is connected to a charge ring driving circuit for charging control of drops being generated by one of nozzles in print head 20. It will be appreciated, however, that the signals on lines 84 could be used for controlling any type of dot matrix copying device.

While the form of apparatus herein described constitutes a preferred embodiment of the invention, it is to be understood that the invention is not limited to this precise form of apparatus, and that changes may be made therein without departing from the scope of the invention.

What is claimed is:

1. Dot matrix copying apparatus comprising:
    document support means for supporting a document to be copied,
    optical grating means positioned adjacent said document support means,
    a collimating lens for viewing a portion of said document and a portion of said optical grating and collimating the light collected therefrom,
    a rotatable mirror for angular scanning of said collimated light,
    an imaging lens for receiving said angularly scanned light and projecting a moving image of said document portion and said optical grating portion,
    an arrangement of photosensing elements positioned for sensing the image of said document portion,
    storage means for storing output signals from said arrangement of photosensing elements,
    copy support means for supporting a print receiving member,
    an arrangement of dot matrix printing elements connected to said storage means for printing on said print receiving member an image of said document,
    printing transport means connected to said copy support means for producing relative movement between said print receiving member and said dot matrix printing elements corresponding to the angular scanning movement of said rotatable mirror,
    timing means for transferring image information from said storage means to said dot matrix printing elements in synchronism with the relative movement between said print receiving member and said dot matrix printing elements,
    a separate photosensing element adjacent aforesaid arrangement of photosensing elements for sensing the image of said optical grating portion, and
    synchronizing means responsive to the output of said separate photosensing element for controlling the operation of said storage means to reduce optical distortion effects.

2. Apparatus according to claim 1 wherein said storage means comprises a random access memory and said synchronizing means comprises an input control counter for counting output signals from said separate photosensing element to generate a series of input address signals and means for connecting said memory to said input control counter and causing said input address signals to select storage locations within said memory for storage of said image data.

3. Apparatus according to claim 2 wherein said timing means comprises a clock for generating a regular series of timing pulses, an output control counter connected to said clock for counting said timing pulses to generate a series of output address signals, and means for connecting said memory to said output control counter and causing said output address signals to select storage locations within said memory for transferring said image data to said printing elements.

4. Apparatus according to claim 3 wherein said timing means are connected to erase said storage locations after transferring said image data to said printing elements.

5. Apparatus according to claim 1 further comprising: table means for supporting said collimating lens, said rotatable mirror, said imaging lens and all of said photosensing elements; and translational drive means for producing relative translational movement between said table means and said document support means.

6. Apparatus according to claim 5 wherein said dot matrix printing elements are arranged in correspondence with the arrangement of said photosensing elements, wherein said copy support means comprises a cylindrical drum, and wherein said printing transport means comprises means to rotate said drum about its longitudinal axis and means to transport said printing elements in a direction parallel to said longitudinal axis.

7. Apparatus according to claim 6 wherein said dot matrix printing elements are jet drop printing elements.

* * * * *